US012810661B2

(12) United States Patent
Sawada et al.

(10) Patent No.: US 12,810,661 B2
(45) **Date of Patent: *Nov. 24, 2026**

(54) INFORMATION PRESENTATION DEVICE

(71) Applicant: SUBARU CORPORATION, Tokyo (JP)

(72) Inventors: Naomichi Sawada, Tokyo (JP); Kazuto Hanawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 18/978,076

(22) Filed: Dec. 12, 2024

(65) Prior Publication Data

US 2025/0111711 A1 Apr. 3, 2025

Related U.S. Application Data

(63) Continuation of application No. PCT/JP2023/011117, filed on Mar. 22, 2023.

(51) Int. Cl.
*G07C 5/02* (2006.01)
*G10K 15/02* (2006.01)
(Continued)

(52) U.S. Cl.
CPC ............... *G07C 5/02* (2013.01); *G10K 15/02* (2013.01); *H04R 3/04* (2013.01); *H04R 3/12* (2013.01); *H04R 5/02* (2013.01); *H04R 2499/13* (2013.01)

(58) Field of Classification Search
CPC . G07C 5/02; G10K 15/02; H04R 3/04; H04R 3/12; H04R 5/02; H04R 2499/13; B60R 11/02
See application file for complete search history.

(56) References Cited

U.S. PATENT DOCUMENTS

2010/0063678 A1 3/2010 Yamamoto
2021/0297769 A1* 9/2021 Brummer ............... B60K 35/26

FOREIGN PATENT DOCUMENTS

JP H06-332469 A 12/1994
JP 2001-165711 A 6/2001
(Continued)

OTHER PUBLICATIONS

U.S. Appl. No. 18/978,067 Claims (Year: 2026).*
(Continued)

*Primary Examiner* — Nhi Q Bui
(74) *Attorney, Agent, or Firm* — Rimon P.C.

(57) ABSTRACT

An information presentation device includes one or more speakers, an acceleration detector, and a processor. The one or more speakers are configured to present an occupant of a vehicle with audio information. The one or more acceleration detectors are configured to respectively output one or more acceleration signals respectively indicating vertical acceleration rates of one or more unsprung components that make relative displacements to a vehicle body of the vehicle in accordance with strokes of one or more suspensions that support respectively one or more wheels of the vehicle. The processor is configured to perform filter processing with a predetermined frequency band on the one or more acceleration signals and output one or more resultant signals as one or more driving signals respectively to the one or more speakers.

13 Claims, 2 Drawing Sheets

(51) Int. Cl.

| | |
|---|---|
| ***H04R 3/04*** | (2006.01) |
| ***H04R 3/12*** | (2006.01) |
| ***H04R 5/02*** | (2006.01) |

(56) References Cited

FOREIGN PATENT DOCUMENTS

| | | | | |
|---|---|---|---|---|
| JP | 2006-7913 | A | | 1/2006 |
| JP | 2006007913 | A | * | 1/2006 |
| JP | 2006-131136 | A | | 5/2006 |
| JP | 2007155525 | A | * | 6/2007 |
| JP | 2010-64590 | A | | 3/2010 |
| JP | 2012-141244 | A | | 7/2012 |
| JP | 2021-528887 | A | | 10/2021 |

OTHER PUBLICATIONS

U.S. Appl. No. 18/978,086 Claims (Year: 2026).*
International Search Report (with English translation) and Written Opinion dated Jun. 20, 2023, from corresponding International Application No. PCT/JP2023/011117, 9 pages.
Notice of Reasons for Refusal received in corresponding Japanese Patent Application No. 2025-507997, dated Jul. 28, 2026.

* cited by examiner

INFORMATION PRESENTATION DEVICE

CROSS-REFERENCE TO RELATED APPLICATIONS

This application is continuation of International Application No. PCT/JP2023/011117, filed on Mar. 22, 2023, the entire contents of which are hereby incorporated by reference.

BACKGROUND

The disclosure relates to an information presentation device configured to present an occupant of a vehicle with audio information.

As a technique related to use of audio information for an occupant of a vehicle such as an automobile, for example, Japanese Unexamined Patent Application Publication (JP-A) No. H06-332469 describes an active muffling device for a vehicle. The active muffling device detects vibration while traveling by an acceleration rate sensor, and adds detected signals by an addition circuit to generate a reference signal. The reference signal is supplied to a microprocessor, subjected to adaptive signal processing, and thereafter, outputted as an output control signal in the form of a secondary sound from a speaker to muffle road noises.

As a technique related to attachment of an acceleration rate sensor to an unsprung component of a suspension of a vehicle, JP-A No. 2010-64590 describes a sensor system for a motion control. The sensor system makes a travel stability control in cornering of a moving body. In the sensor system, an acceleration rate sensor is attached to a knuckle rigidly coupled to a lower portion of a shock absorber or to lower side of the shock absorber. Furthermore, an acceleration rate sensor head includes any one of acceleration rate sensors that detect a lateral acceleration rate, a longitudinal acceleration rate, and a vertical acceleration rate, or any combination thereof.

SUMMARY

An aspect of the disclosure provides an information presentation device including one or more speakers, one or more acceleration detectors, and a processor. The one or more speakers are configured to present an occupant of a vehicle with audio information. The one or more acceleration detectors are configured to respectively output one or more acceleration signals respectively indicating vertical acceleration rates of one or more unsprung components that make relative displacements to a vehicle body of the vehicle in accordance with strokes of one or more suspensions that respectively support one or more wheels of the vehicle. The processor is configured to perform filter processing with a predetermined frequency band on the one or more acceleration signals and output one or more resultant signals as one or more driving signals respectively to the one or more speakers.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
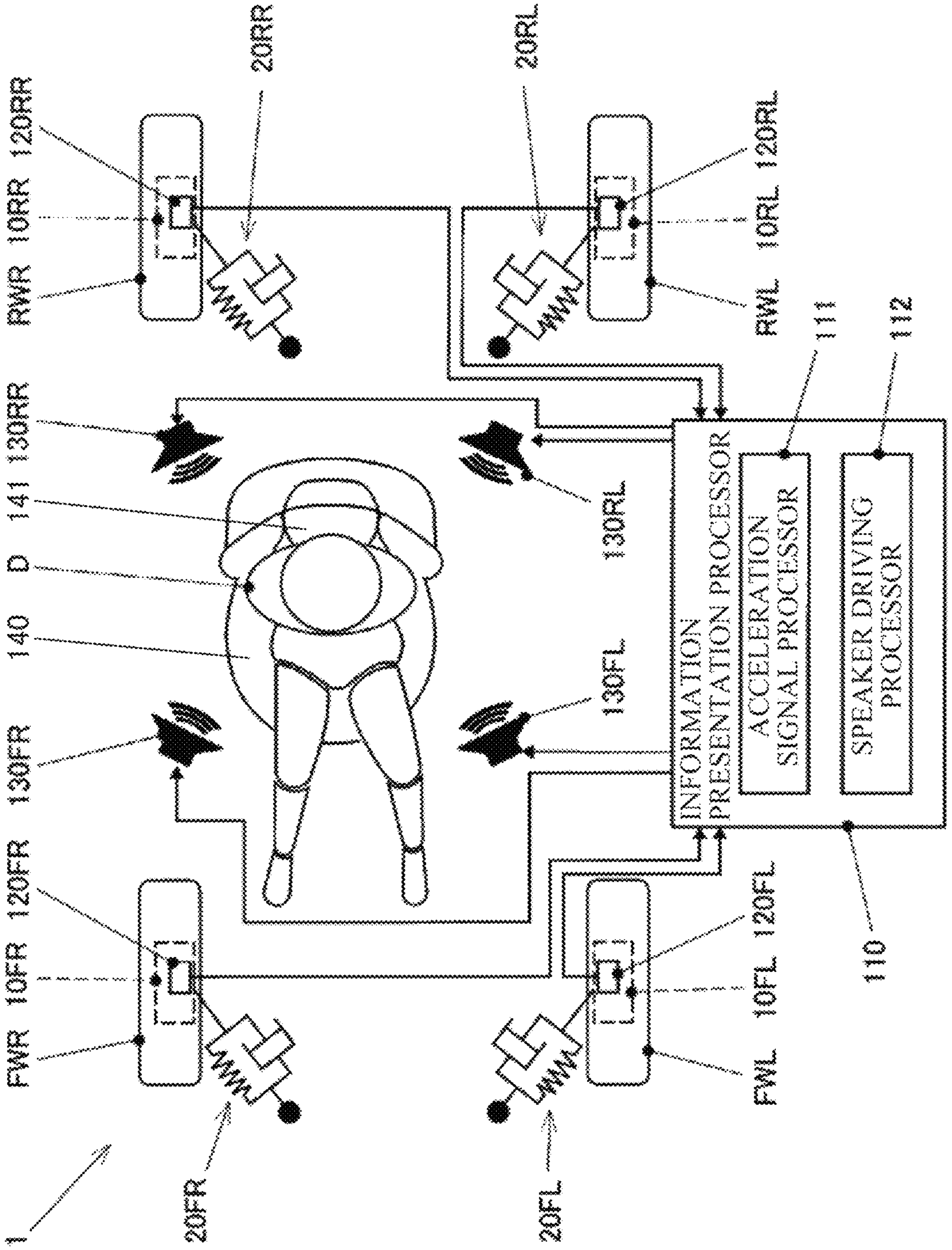
FIG. 1 is a schematic diagram of a configuration of a vehicle on which an information presentation device according to an embodiment of the disclosure is provided.

Generally, a driver observes a road surface state, behavior of a vehicle body, and behavior of tires, to predict vehicle behavior and a road surface shape. A vehicle body means sprung portions of suspensions. Tires mean unsprung portions of the suspensions.

In recent years, however, by electrification of power units and adoption of steer-by-wire steering devices, there is tendency of a decrease in information the driver obtains from a vehicle as a sound or vibration.

Lack of such information makes it difficult to grasp the road surface state and behavior of each portion of a vehicle. This causes a concern about reduction in the sense of unity with the vehicle and the sense of grounding.

In contrast, making it possible to present the driver with information related to vertical behavior of unsprung components such as tires makes it possible to enhance predictability for the driver of the vehicle behavior, and to enhance the sense of unity with the vehicle and the sense of grounding.

It is desirable to provide an information presentation device that makes it possible to appropriately present an occupant of a vehicle with information regarding vertical behavior of unsprung components.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

An information presentation device according to an embodiment of the disclosure may be provided in, for example, an automobile such as a passenger car. The information presentation device according to the embodiment is configured to present, by audio information, an occupant with information regarding vertical behavior of unsprung components that displace with respect to a vehicle body, together with tires, in accordance with strokes of suspensions. The occupant may be, for example, a driver.

FIG. 1 schematically illustrates a configuration of a vehicle on which the information presentation device according to the embodiment is provided.

A vehicle 1 may include a four-wheel vehicle including a right front wheel FWR, a left front wheel FWL, a right rear wheel RWR, and a left rear wheel RWL.

The right front wheel FWR may be attached to a right front housing 10FR.

The left front wheel FWL may be attached to a left front housing 10FL.

The right rear wheel RWR may be attached to a right rear housing 10RR.

The left rear wheel RWL may be attached to a left rear housing 10RL.

The housings may accommodate respective hub bearings that rotatably support the respective wheels.

The housings are the unsprung components that are provided wheelward of suspension springs and make relative displacements to the vehicle body together with the wheels, or the tires, in accordance with the strokes of the suspensions.

The right front housing 10FR may be attached to the vehicle body, with a right front suspension 20FR in between.

The left front housing 10FL may be attached to the vehicle body, with a left front suspension 20FL in between.

The right rear housing 10RR may be attached to the vehicle body, with a right rear suspension 20RR in between.

The left rear housing 10RL may be attached to the vehicle body, with a left rear suspension 20RL in between.

The suspensions may each include the suspension spring and a damper. The suspension spring may generate a spring reaction force in accordance with the stroke. The damper may generate a damping force in accordance with a speed of the stroke.

An information presentation device 100 according to the embodiment is configured to present a driver D accommodated in a cabin with information regarding the vertical behavior of the right front wheel FWR, the left front wheel FWL, the right rear wheel RWR, and the left rear wheel RWL, with respect to the vehicle body, as the audio information.

The information presentation device 100 may include, without limitation, an information presentation processor 110, a right front acceleration sensor 120FR, a left front acceleration sensor 120FL, a right rear acceleration sensor 120RR, a left rear acceleration sensor 120RL, a right front speaker 130FR, a left front speaker 130FL, a right rear speaker 130RR, and a left rear speaker 130RL.

The information presentation processor 110 is configured to generate driving signals for the respective speakers in accordance with acceleration signals outputted by the right front acceleration sensor 120FR, the left front acceleration sensor 120FL, the right rear acceleration sensor 120RR, and the left rear acceleration sensor 120RL, and output the driving signals to the right front speaker 130FR, the left front speaker 130FL, the right rear speaker 130RR, and the left rear speaker 130RL.

A configuration and operation of the information presentation processor 110 are described later in detail.

The right front acceleration sensor 120FR may be attached to the right front housing 10FR.

The left front acceleration sensor 120FL may be attached to the left front housing 10FL.

The right rear acceleration sensor 120RR may be attached to the right rear housing 10RR.

The left rear acceleration sensor 120RL may be attached to the left rear housing 10RL.

The right front acceleration sensor 120FR, the left front acceleration sensor 120FL, the right rear acceleration sensor 120RR, and the left rear acceleration sensor 120RL are configured to detect vertical acceleration rates of the housings to which they are attached, and output output-signals, i.e., the acceleration signals, in accordance with the acceleration rates.

The output-signals outputted by the respective acceleration sensors may be transmitted to the information presentation processor 110.

The right front speaker 130FR, the left front speaker 130FL, the right rear speaker 130RR, and the left rear speaker 130RL are configured to vibrate the air around the ears, or the head, of the driver D, i.e., the air around a headrest 141 of a driver's seat 140, and present the driver D with the audio information.

The right front speaker 130FR may be disposed right frontward of the ear of the driver D, i.e., right frontward of the headrest 141 of the driver's seat 140.

The left front speaker 130FL may be disposed left frontward of the ear of the driver D, i.e., left frontward of the headrest 141 of the driver's seat 140.

The right rear speaker 130RR may be disposed right rearward of the ear of the driver D, i.e., right rearward of the headrest 141 of the driver's seat 140.

The left rear speaker 130RL may be disposed left rearward of the ear of the driver D, i.e., left rearward of the headrest 141 of the driver's seat 140.

When the vehicle includes an infotainment system, an audio system, or the like that play back music, etc., speakers used in the infotainment system, the audio system, or the like may serve as the right front speaker 130FR, the left front speaker 130FL, the right rear speaker 130RR, and the left rear speaker 130RL.

The information presentation processor 110 may include, for example, an acceleration signal processor 111 and a speaker driving processor 112.

The acceleration signal processor 111 may perform predetermined signal processing on the acceleration signals outputted by the right front acceleration sensor 120FR, the left front acceleration sensor 120FL, the right rear acceleration sensor 120RR, and the left rear acceleration sensor 120RL.

The acceleration signal processor 111 may include a filter such as a band-pass filter configured to relatively emphasize a predetermined frequency band in the acceleration signals over other frequency bands, or reduce other frequency bands.

The signal processing such as filter processing in the acceleration signal processor 111 may be independently performed on the acceleration signals outputted by the right front acceleration sensor 120FR, the left front acceleration sensor 120FL, the right rear acceleration sensor 120RR, and the left rear acceleration sensor 120RL.

The speaker driving processor 112 may amplify the acceleration signals after the filter processing by the acceleration signal processor 111 with a predetermined output gain, and output the driving signals for the right front speaker 130FR, the left front speaker 130FL, the right rear speaker 130RR, and the left rear speaker 130RL.

The speaker driving processor 112 may convert the acceleration signals into audio signals in cooperation with each speaker.

The driving signal for the right front speaker 130FR may be generated using the acceleration signal acquired by the right front acceleration sensor 120FR.

The driving signal for the left front speaker 130FL may be generated using the acceleration signal acquired by the left front acceleration sensor 120FL.

The driving signal for the right rear speaker 130RR may be generated using the acceleration signal acquired by the right rear acceleration sensor 120RR.

The driving signal for the left rear speaker 130RL may be generated using the acceleration signal acquired by the left rear acceleration sensor 120RL.

Figure 2:
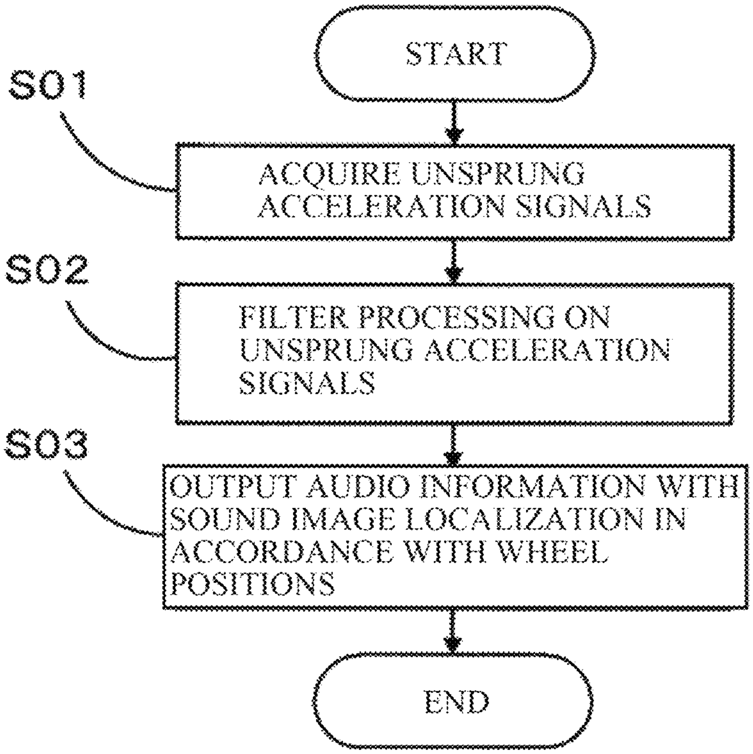
FIG. 2 is a flowchart of operation of the information presentation device according to the embodiment.

FIG. 2 is a flowchart of operation of the information presentation device according to the embodiment.

In the following, the steps are described in order.

Step S01: Acquire Unsprung Acceleration Signals

The information presentation processor 110 may acquire unsprung vertical acceleration signals outputted by the right front acceleration sensor 120FR, the left front acceleration sensor 120FL, the right rear acceleration sensor 120RR, and the left rear acceleration sensor 120RL.

Thereafter, the flow may proceed to step S02.

Step S02: Filter Processing on Unsprung Acceleration Signals

The acceleration signal processor 111 of the information presentation processor 110 may perform the filter processing to emphasize the predetermined frequency band highly correlated with transmission of vibration from the tires to the vehicle body, on the acceleration signals acquired in step S01.

The acceleration signal processor 111 may be configured to perform band-pass filter processing on acceleration rate vibration detected at the housing of each wheel, to emphasize a frequency band including a frequency of vibration to be generated in accompaniment with the stroke of the suspension of the relevant wheel and a natural frequency of a longitudinal spring of the tire, over other frequency bands. The vibration to be generated in accompaniment with the stroke of the suspension of the relevant wheel is, for example, vibration to be generated on the occasion of sliding motions of a damper.

Thereafter, the flow may proceed to step S03.

Step S03: Output Audio Information with Sound Image Localization in Accordance with Wheel Positions The speaker driving processor 112 of the information presentation processor 110 may output the driving signals for the right front speaker 130FR, the left front speaker 130FL, the right rear speaker 130RR, and the left rear speaker 130RL in accordance with the acceleration signals subjected to the filter processing in step S02.

At this occasion, the speaker driving processor 112 may present the driver D with the audio signals based on the acceleration signals acquired from the acceleration sensors of the respective wheels, with sound image localization that differs with the positions of the respective wheels. The sound image localization is positions of sound sources to be recognized by the driver D.

In one example, directions in the sound image localization as viewed from the driver D may be close to directions of the respective wheels as viewed from the driver D, i.e., directions of the respective wheels with respect to the headrest 141 of the driver's seat 140. For example, the directions in the sound image localization as viewed from the driver D may coincide with the directions of the respective wheels.

In one example, the audio information based on the acceleration signal acquired by the right front acceleration sensor 120FR may be outputted by the right front speaker 130FR to be heard from right frontward of the driver D, i.e., right frontward of the headrest 141 of the driver's seat 140.

The audio information based on the acceleration signal acquired by the left front acceleration sensor 120FL may be outputted by the left front speaker 130FL to be heard from left frontward of the driver D, i.e., left frontward of the headrest 141 of the driver's seat 140.

The audio information based on the acceleration signal acquired by the right rear acceleration sensor 120RR may be outputted by the right rear speaker 130RR to be heard from right rearward of the driver D, i.e., right rearward of the headrest 141 of the driver's seat 140.

The audio information based on the acceleration signal acquired by the left rear acceleration sensor 120RL may be outputted by the left rear speaker 130RL to be heard from left rearward of the driver D, i.e., left rearward of the headrest 141 of the driver's seat 140.

Thereafter, the series of processes may be ended and the flow may return.

According to the embodiment described above, it is possible to obtain the following effects.

(1) By presenting the driver D with the audio information in accordance with the acceleration signals indicating the vertical acceleration rates of the right front housing 10FR, the left front housing 10FL, the right rear housing 10RR, and the left rear housing 10RL as the unsprung components of the vehicle 1, it is possible to allow the driver D to perceive the vertical behavior of an unsprung portion of the vehicle, e.g., the tires. Hence, it is possible to enhance predictability for the driver D of the behavior of a sprung portion of the vehicle, e.g., the vehicle body.

Moreover, it is possible to allow the driver D to perceive information regarding grounding loads to be applied to the tires, or information regarding a road surface shape.

This makes it possible to enhance the sense of unity with the vehicle 1 and the sense of grounding to be felt by the driver D.

Furthermore, by performing the information presentation by the audio information, it is possible to prevent influences of, for example, a thickness of clothing as in a case where the information presentation is performed by vibration of the seat.

(2) The vehicle 1 may include a four-wheel vehicle including the right front wheel FWR, the left front wheel FWL, the right rear wheel RWR, the left rear wheel RWL. The right front acceleration sensor 120FR, the left front acceleration sensor 120FL, the right rear acceleration sensor 120RR, and the left rear acceleration sensor 120RL may output the acceleration signals indicating the vertical acceleration rates of the right front housing 10FR provided on the right front wheel FWR, the left front housing 10FL provided on the left front wheel FWL, the right rear housing 10RR provided on the right rear wheel RWR, and the left rear housing 10RL provided on the left rear wheel RWL. The right front speaker 130FR, the left front speaker 130FL, the right rear speaker 130RR, and the left rear speaker 130RL are configured to present the driver D with the audio information in accordance with the acceleration signals indicating the vertical acceleration rates of the right front housing 10FR, the left front housing 10FL, the right rear housing 10RR, and the left rear housing 10RL, with the sound image localization right frontward, left frontward, right rearward, and left rearward of the driver D, i.e., the headrest 141 of the driver's seat 140. Thus, presenting the information regarding each wheel in a four-wheel vehicle as the audio information with the sound image localization located on the four sides of the occupant, i.e., on the four sides of the headrest 141 of the driver's seat 140, makes it possible to allow the occupant to intuitively grasp the positions of the wheels as the information sources.

(3) By emphasizing the predetermined frequency band highly correlated with the transmission of the vibration from the unsprung components to sprung components, that is, by emphasizing the frequency band of the vibration to be generated in accompaniment with the strokes of the suspensions, the natural frequency of the tires, or both, it is possible to effectively enhance the predictability of the behavior of the sprung portion.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the information presentation device and the vehicle are not limited to the configurations of the forgoing embodiment, but may be changed as appropriate.

(2) In the embodiment, the acceleration sensors are attached to the housings that accommodate the hub bearings. However, the acceleration sensors may be attached to other positions insofar as the acceleration sensors are attached to unsprung portions of the suspensions, that is, portions that make relative displacements to the vehicle body.

For example, the acceleration sensors may be attached to suspension arms, or links, unsprung portions of shock absorbers, a brake device, an inside of each tire, the wheels, or the like.

Moreover, in a case with stroke sensors configured to detect the strokes of the suspensions, the acceleration rates of the unsprung components may be calculated based on the detected strokes.

(3) In the embodiment, the audio information based on the acceleration signals acquired by the right front, left front, right rear, and left rear acceleration sensors are outputted from the right front, left front, right rear, and left rear speakers in one-to-one corresponding relation to the acceleration sensors. However, the acceleration sensors and the speakers do not have to be in the one-to-one corresponding relation. For example, the audio information based on an output of a single acceleration sensor may be outputted from multiple speakers. Moreover, the audio information based on outputs of multiple acceleration sensors may be outputted from a common speaker. In this case, the sound image localization of the audio information based on the outputs of the respective acceleration sensors may be set by, for example, a volume balance between the speakers, frequency characteristics of each speaker, and phase differences between the speakers.

(4) In the embodiment, the acceleration rates of the housings of all the four wheels are detected and the acceleration signals are presented as the audio signals. However, the disclosure is not limited thereto. The acceleration signals of the unsprung components of some of the wheels, whether one wheel or multiple wheels, may be presented as the audio information. In this case, when presenting the acceleration signals of the unsprung components of multiple wheels, the sound image localization of the audio information may differ in accordance with the positions of the wheels.

The information presentation processor 110 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the information presentation processor 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the information presentation processor 110 illustrated in FIG. 1.

The invention claimed is:

1. An information presentation device comprising:

one or more speakers configured to present, to an occupant of a vehicle, audio information representing vertical behavior of one or more unsprung components of the vehicle;

one or more acceleration detectors configured to output one or more acceleration signals indicating vertical acceleration rates of the one or more unsprung components that make relative displacements to a vehicle body of the vehicle in accordance with strokes of one or more suspensions that respectively support one or more wheels of the vehicle; and a processor configured to:

perform band-pass filter processing on the one or more acceleration signals to pass components within a predetermined frequency band and reduce components outside the predetermined frequency band; and output the one or more acceleration signals subjected to the band-pass filter processing as one or more driving signals respectively to the one or more speakers.

2. The information presentation device according to claim 1, wherein the one or more wheels comprise a plurality of wheels, the one or more speakers comprise a plurality of speakers, the one or more unsprung components comprise a plurality of unsprung components, the one or more acceleration signals comprise a plurality of acceleration signals, the one or more acceleration detectors are configured to respectively output the acceleration signals indicating vertical acceleration rates of the unsprung components provided on the wheels respectively, and the speakers are configured to present, to the occupant of the vehicle, the acceleration signals subjected to the band-pass filter processing as the audio information, such that sound image localization of the audio information differs according to positions of the wheels on which the unsprung components are provided.

3. The information presentation device according to claim 1, wherein the vehicle is a four-wheel vehicle with a right front wheel, a left front wheel, a right rear wheel, and a left rear wheel, the one or more acceleration detectors are configured to respectively output the one or more acceleration signals indicating vertical acceleration rates of the one or more unsprung components provided respectively on the right front wheel, the left front wheel, the right rear wheel, and the left rear wheel, the one or more speakers comprise a plurality of speakers, and the speakers are configured to present, to the occupant of the vehicle, the one or more acceleration signals subjected to the band-pass filter processing as the audio information, with sound images corresponding to the right front wheel, the left front wheel, the right rear wheel, and the left rear wheel being localized, respectively, right frontward, left frontward, right rearward, and left rearward of a headrest of a driver's seat of the vehicle.

4. The information presentation device according to claim 1, wherein the processor comprises an acceleration signal processor configured to perform the band-pass filter processing on the one or more acceleration signals and generate the audio information from the one or more acceleration signals subjected to the band-pass filter processing.

5. The information presentation device according to claim 2, wherein the processor comprises an acceleration signal processor configured to perform the band-pass filter processing on the one or more acceleration signals and generate the audio information from the one or more acceleration signals subjected to the band-pass filter processing.

6. The information presentation device according to claim 4, wherein the predetermined frequency band comprises one or both of a frequency of vibration to be generated in accompaniment with the strokes of the suspensions and a natural frequency of one or more tires of the vehicle.

7. The information presentation device according to claim 5, wherein the predetermined frequency band comprises one or both of a frequency of vibration to be generated in accompaniment with the strokes of the suspensions and a natural frequency of one or more tires of the vehicle.

8. The information presentation device according to claim 6, wherein the predetermined frequency band includes both the frequency of vibration and the natural frequency, the frequency of vibration is generated on an occasion of sliding motions of a damper included in at least one of the suspensions, and the natural frequency is a natural frequency of a longitudinal spring of at least one tire of the vehicle.

9. The information presentation device according to claim 7, wherein the predetermined frequency band includes both the frequency of vibration and the natural frequency, the frequency of vibration is generated on an occasion of sliding motions of a damper included in at least one of the suspensions, and the natural frequency is a natural frequency of a longitudinal spring of at least one tire of the vehicle.

10. The information presentation device according to claim 4, wherein the processor further comprises a speaker driving processor configured to amplify the one or more acceleration signals subjected to the band-pass filter processing with a predetermined output gain and output the amplified acceleration signals as the one or more driving signals respectively to the one or more speakers.

11. The information presentation device according to claim 5, wherein the processor further comprises a speaker driving processor configured to amplify the one or more acceleration signals subjected to the band-pass filter processing with a predetermined output gain and output the amplified acceleration signals as the one or more driving signals respectively to the one or more speakers.

12. The information presentation device according to claim 5, wherein the acceleration signal processor is configured to independently perform the band-pass filter processing on each of the plurality of acceleration signals.

13. The information presentation device according to claim 2, wherein the sound image localization of the audio information is set based on a volume balance between the speakers, frequency characteristics of each of the speakers, and phase differences between the speakers.

* * * * *